May 22, 1962     M. J. DUNN     3,035,442

COUPLING MEANS FOR FLUID METERS

Filed Sept. 16, 1957

INVENTOR.
Michael J. Dunn
BY
*John W. Michael*

United States Patent Office 3,035,442
Patented May 22, 1962

3,035,442
COUPLING MEANS FOR FLUID METERS
Michael J. Dunn, Menomonee Falls, Wis., assignor to Badger Meter Manufacturing Company, Milwaukee, Wis., a corporation of Wisconsin
Filed Sept. 16, 1957, Ser. No. 684,355
2 Claims. (Cl. 73—258)

This invention relates to fluid meters and the like and particularly to an improved coupling means between the measuring and the registering mechanisms of the meter.

The measuring and registering mechanisms of a meter are generally housed in separate chambers separated by a common wall and connected by a drive shaft passing through a stuffing box in such wall. It has been a problem to maintain such stuffing box in leak-proof condition over a long period of unserviced usage and to keep frictional losses low.

It is the primary object of this invention, therefore, to provide an improved means for coupling the measuring and registering mechanisms together which requires no opening in the wall between the chambers thereby eliminating the stuffing box and any possibility of leakage therebetween.

Another object of this invention is to increase the efficiency of the measuring mechanism, particularly, at low flow rates.

The first object is attained by a pair of magnets rotatably mounted in juxtaposition to each other on either side of an imperforate wall of non-magnetic material separating the measuring and registering chambers. One magnet is operatively connected to the measuring mechanism and the other to the registering mechanism and rotate as a unit to effectively couple the two mechanisms.

The mountings for both magnets include oppositely reacting bearings. The mounting for the magnet for the measuring mechanism also has a drive pawl and can and does carry a resilient member which bears outwardly and downwardly on the drive spindle of the nutating impeller disc. This maintains a sealing rolling pressure between such disc and the conical walls to thereby prevent leakage therebetween at low flow rates.

Figure 1:
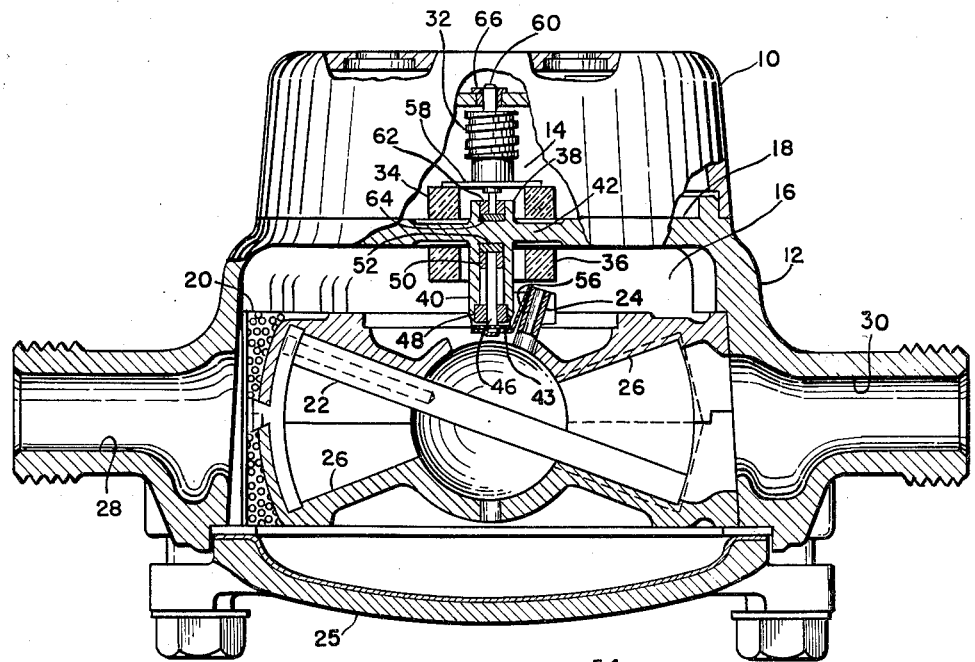
FIG. 1 is a partial vertical sectional view of a meter embodying the invention with parts of the cover broken away.

The fluid meter shown in the drawing has an upper housing 10 hermetically sealed to a lower housing 12. These housings contain respectively an upper chamber 14 for the registering mechanism (not shown) and a lower chamber 16 separated by an imperforate wall 18 of non-magnetic material.

A measuring mechanism of well-known design has a chamber 20 complete with a nutating disc 22 and drive spindle 24 mounted in the lower chamber 16 through a bottom opening closed in the customary manner by closure member 25. The disc 22 has a rolling bearing against conical walls 26 and the passage of liquid from an inlet 28 out through an outlet 30 causes the spindle 24 to generate a cone each time a defined volume of fluid passes through.

The circling motion of the spindle 24 is transmitted to a worm 32 for driving the registering mechanism (not shown) a magnetic coupling which includes ring-shaped magnetic members 34 and 36 rotatably mounted in juxtaposition on opposite sides of the imperforate wall 18. This wall has oppositely projecting hollow bearing bosses 38 and 40 and the area surrounding them may be of reduced thickness as indicated at 42 to reduce the magnetic path. The magnetic members are preferably of ceramic material containing permanently magnetizable portions arranged and magnetized to form on the opposing faces of each member equally angularly spaced magnetic poles of alternately opposite polarity. An example of a suitable material for such magnetic members is a blend of light weight barium and iron oxide powders, one form of which is available commercially under the trade name "Ceramagnet."

Figure 4:
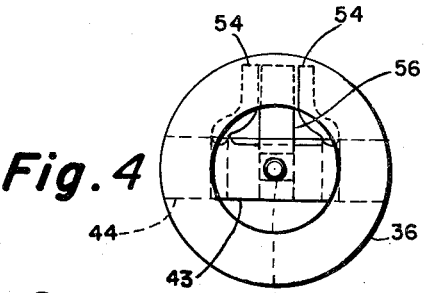
FIG. 4 is a top plan view of such rotor assembly.
Figure 2:
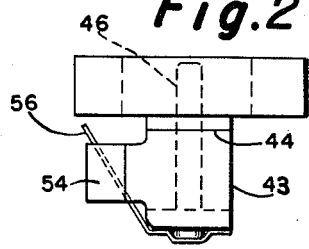
FIG. 2 is a view in front elevation of the lower rotor assembly including the drive pawl.
Figure 3:
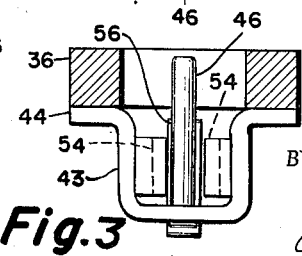
FIG. 3 is a view in right side elevation of such assembly with the ring-shaped magnet shown in section.

Magnetic member 36 is mounted on and driven by a rotor 43 (FIGS. 2, 3 and 4). The magnet is secured to horizontally extending flanges 44 on such rotor by a suitable adhesive such as epoxy resin with the surface containing the poles facing upwardly. A shaft 46 extending upwardly from the bottom of said rotor is journaled in cylindrical bearings 48 and 50 and thrusts against a flat bearing 52. Such bearings are preferably glass-filled Teflon and are mounted as shown in the boss 40. The rotor 22 has a drive pawl consisting of arms 54 extending laterally therefrom and spaced to receive the spindle 24 therebetween.

A leaf spring 56 (FIGS. 2, 3 and 4) is fastened to the rotor 42 and extends upwardly and outwardly between the arms 54 and bears against the spindle 24 to continually maintain pressure between the face of the disc 22 and conical walls 26 and prevent leakage therebetween, particularly at low flow rates when the pressure of the fluid is insufficient to provide such seal. Spring 56 also serves to bias the shaft 46 upwardly into boss 40 to prevent the shaft from dropping out of its assembled position.

Magnetic member 34 is fastened to the bottom of a washer by a suitable adhesive such as epoxy resin with its pole containing face facing downwardly. A shaft 60 is staked to such washer and the worm 32 is pressed on such shaft. The lower end of shaft 60 is journaled in glass-filled Teflon cylindrical bearing 62 and thrusts against a flat bearing 64 of like material, both mounted in the boss 38. The upper end of the shaft 60 is journaled in a cylindrical bearing 66 mounted in a support for the registering mechanism.

The magnetic lines of force pass between the opposite poles of the magnetic members 34 and 36 readily through the non-magnetic wall 18 creating a relatively strong attracting force between such members. The thrust load is carried by the bearings 52 and 64 with a minimum of friction, thus permitting the attractive force to have a maximum component for causing rotational force to be transmitted between such members. Since there is no connecting shaft between the measuring mechanism and the registering mechanism passing through wall 18, no sealing means is required. Hence leakage between the chambers and stuffing box frictional loss are eliminated.

I claim:

1. In a fluid meter, a measuring chamber and a registering chamber separated by imperforate wall means of non-magnetic material, measuring means in said measuring chamber including a nutating disc and spindle movable in a cone-like path, a rotatable member journaled in said registering chamber, a thrust bearing for said rotatable member supported in said registering chamber, a first ring-shaped magnetic member having permanently magnetized portions on its lower face of alternately opposite polarity fixed to said rotatable member for rotation in said registering chamber close to said wall means, a rotor journaled in said measuring chamber and having spaced spindle engaging parts, a thrust bearing for said rotor supported in said measuring chamber, and a second ring-shaped magnetic member having permanently magnetized portions on its upper face of alternately opposite polarity fixed to said rotor in juxtaposition to said first ring-shaped magnetic member for rotation close to said wall means on the opposite side of said wall means from said first ring-shaped magnetic member, said spindle operating between said rotor parts to constitute coupling means between said spindle and said rotor.

2. In a fluid meter, a measuring chamber and a registering chamber separated by an imperforate wall of nonmagnetic material, said wall having oppositely projecting hollow bearing bosses formed thereon, measuring means in said measuring chamber including a nutating disc and spindle movable in a cone-like path, a shaft journaled in one of said bosses, a first magnetic member fixed to said shaft for rotation in said registering chamber close to said wall a second shaft journaled in said other boss, a rotor mounted on said second shaft, a second magnetic member fastened to said rotor mounted on said second shaft for rotation in said measuring chamber close to said wall in juxtaposition to said first magnetic member, said rotor having a drive pawl thereon in engagement with said spindle and a resilient member fastened thereto extending upwardly and outwardly to engage said spindle, and a pair of thrust bearings mounted in said bosses on which the ends of said shaft rotate, said rotor being of substantially U-shape and having a pair of horizontally extending flanges to which said second magnetic member is fastened and a pair of vertically spaced spaced arms extending therefrom for engagement with said spindle.

References Cited in the file of this patent

UNITED STATES PATENTS

| | | |
|---|---|---|
| 384,024 | Davies | June 5, 1888 |
| 957,082 | Nash | May 3, 1910 |
| 1,724,272 | Ford | Aug. 13, 1929 |
| 1,724,873 | Ford | Aug. 13, 1929 |
| 2,354,563 | Weisse | July 25, 1944 |
| 2,400,099 | Brubaker | May 14, 1946 |
| 2,681,257 | Niesemann | June 15, 1954 |
| 2,779,513 | Dickey | Jan. 29, 1957 |
| 2,921,468 | Treff et al. | Jan. 19, 1960 |

FOREIGN PATENTS

| | | |
|---|---|---|
| 12,964 | Great Britain | 1850 |
| 417,141 | France | Aug. 23, 1910 |